United States Patent Office 2,949,957
Patented Aug. 23, 1960

2,949,957

FUEL CONTROL SYSTEM FOR GAS TURBINE ENGINES

James M. Eastman, South Bend, Ind., assignor to The Bendix Corporation, a corporation of Delaware Continuation of application Ser. No. 201,090, Dec. 16, 1950. This application Sept. 28, 1954, Ser. No. 459,181

10 Claims. (Cl. 158—36)

This application is a continuation of my copending application Serial No. 201,090, filed December 16, 1950, covering a fuel control system for gas turbine engines, which application is now abandoned without prejudice in view of its being superseded by this present application.

This invention relates to a fuel control system for gas turbine engines, particularly when such engines are to be used in aircraft, and has for its objects to provide in a fuel control device:

Improved isochronous speed governing and quick governor response;

Definite upper and lower limits on the rate of fuel feed during acceleration and deceleration at all altitudes, said limits being selected according to any desired relationship with speed and altitude.

Improved servo actuation of the various control valves and coacting parts with the servo system operated by centrifuged and filtered fuel under pressure from the normal fuel supply;

Ability of the metering system to pass fuel irrespective of a certain amount of dirt and other foreign substances or particles therein;

And to improve the over-all responsiveness and operating characteristics of gas turbine fuel control systems.

Figure 1:
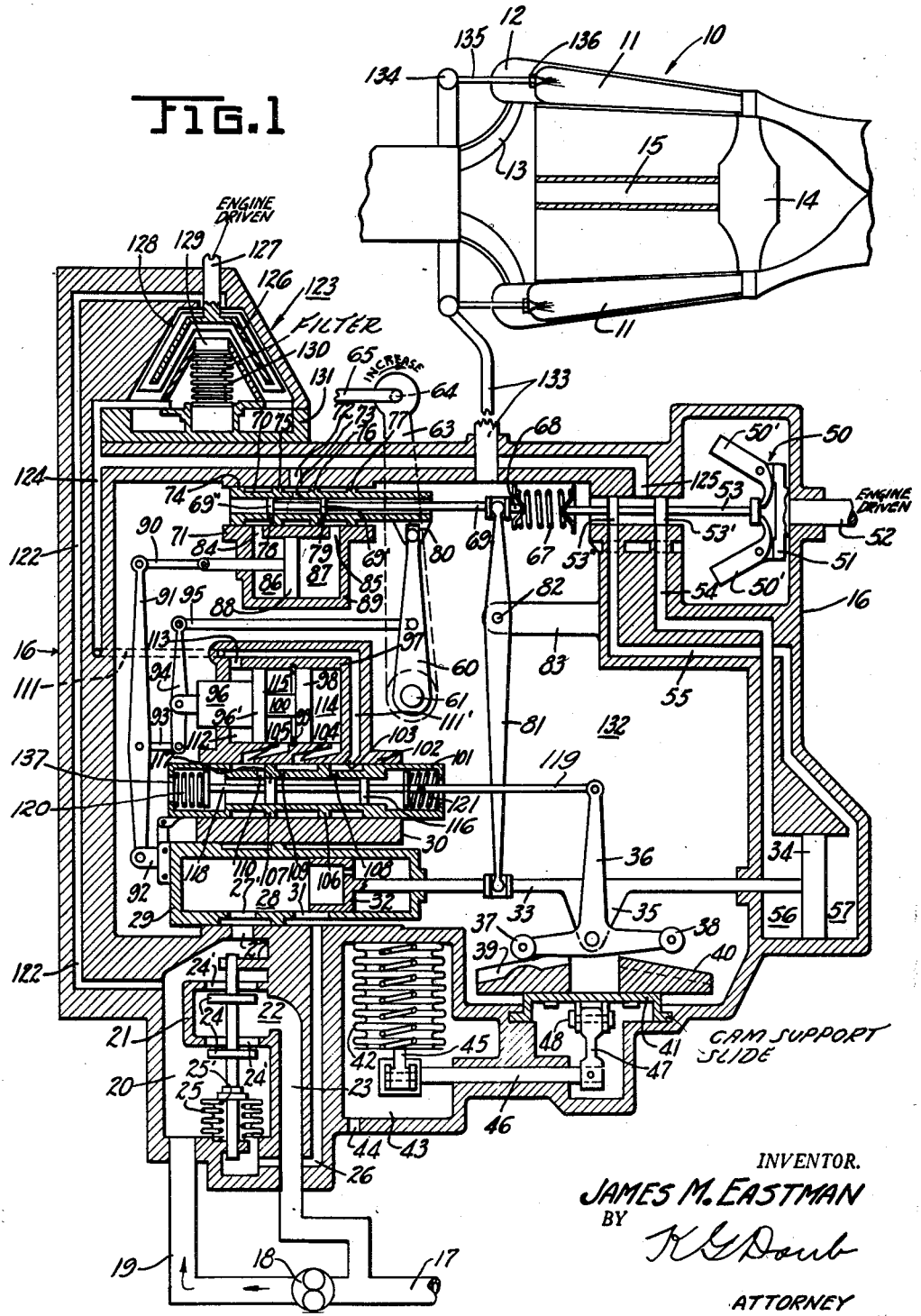
Figure 2:
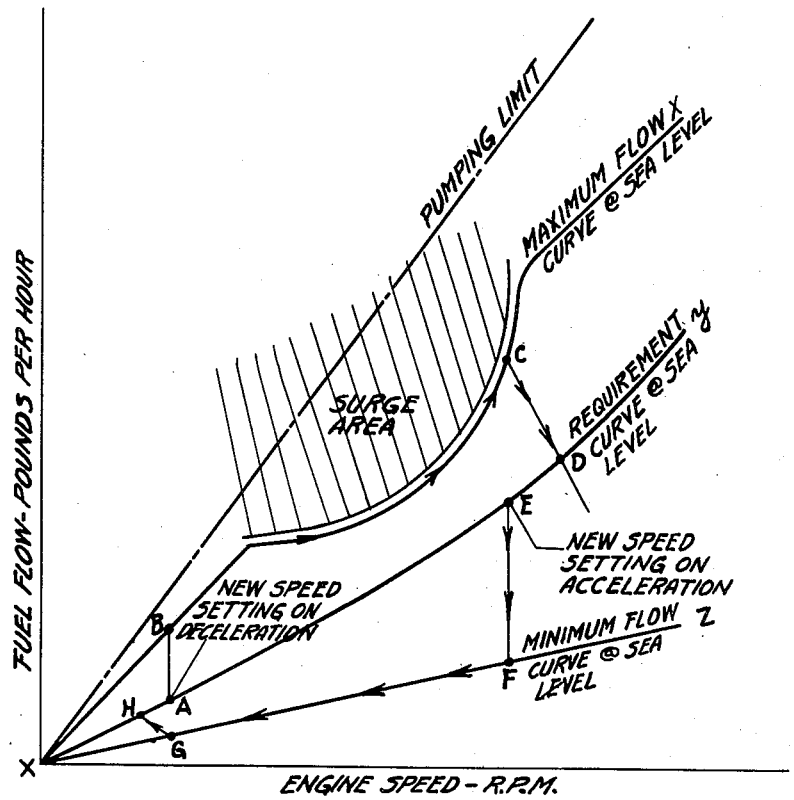

The foregoing and other objects and advantages will become apparent in view of the following description taken in conjunction with the drawings, wherein:

Figure 1 is a schematic view of a fuel control system for a gas turbine engine embodying the features of the present invention; and Figure 2 represents a gas turbine engine sea level performance curve.

Referring to Figure 1 in detail, a gas turbine engine is generally indicated at 10; it is provided with a series of combustion chambers 11 mounted in a casing having a header or air intake section 12 at the forward end thereof. A dynamic compressor is indicated at 13; it is shown as of the centrifugal type, but may be of the axial flow type, and is driven by means of a turbine 14 through a shaft 15. As will be understood, when fuel is supplied to the combustion chambers 11 and ignited, the expanded air and products of combustion are discharged through the turbine, part of the resultant energy being utilized in driving the turbine and compressor and the remainder being used either for jet thrust or for driving a propeller or both, depending upon the particular type of engine involved.

The parts which to to make up the ful control system of the present invention are shown enlarged and mounted in a housing generally indicated at 16. Fuel from a suitable source of supply enters the control unit by way of a conduit 17, having a pressurizing device such as a fuel pump 18 therein, which pressurizes fuel through the entrance conduit 19 into a chamber 20, which is provided with a wall 21 defining a valve chamber 22 and a return or by-pass conduit 23. By-pass valve members 24 are secured on a stem slidably mounted in an adjacent wall of the housing. The valve members 24 control ports 24', through which fuel may pass from chamber 20 to the return conduit 23 and thence to the low pressure side of the pump 18. The by-pass valve is preferably of the balanced poppet type for minimum dirt sensitivity; its stem is equipped with a bellows 25, vented to metered fuel pressure by passage 26. A spring 25' normally urges the valve members 24 toward closed position. With this arrangement, the supply pressure in chamber 20 will always be maintained at a substantially constant value above metered fuel pressure as determined by the strength of spring 25'. Since the valve members 24 are always well open or fully unseated when the system is in operation, their bearing or seating surfaces are always well spaced and there is little or no chance of said surfaces accumulating dirt or fouling.

From chamber 20, fuel flows by way of ports 27 and 27' into chamber 28, formed interiorly of a metering valve cylinder or sleeve 29, slidably mounted in a guide 30 which is part of housing 16. In addition to the intake port 27', the cylinder 29 is formed with a variable metering restriction or port 31, the area of which is controlled by the coacting movements of the cylinder 29 and a metering valve piston 32, slidably mounted in the said cylinder and connected by means of a rod 33 with a primary governor actuator in the form of a servo piston 34, adapted to be actuated in a manner to be described. The rod or shaft 33 is also formed with a bearing portion 35, having pivotally mounted therein a lever 36, provided with oppositely extending arms carrying cam followers 37 and 38. The follower 37 is adapted to engage an accelerating cam 39, while the follower 38 is adapted to engage a deceleration cam 40. These cams are shown as of integral construction and secured on a bracket 41, slidably mounted in the adjacent portion of the housing 16. The object in slidably mounting the acceleration and deceleration cams 39 and 40 is to facilitate positioning thereof for changes in the pressure and temperature and therefore density of the air flowing to the engine. Accordingly, an aneroid or spring-loaded bellows 42 is mounted in a chamber 43, the bellows being suitable charged with a fluid or gas in a known manner to render it responsive to changes in pressure and temperature and the housing in which the bellows is mounted being vented at 44 to ram or compressor inlet air pressure and temperature. The upper end of the bellows is anchored or held stationary while the lower movable end thereof is connected by means of a pivoted link 45 to a lever arm formed on one end of a shaft 46, the opposite end of the said shaft having connected thereto a similar lever arm 47 which is pivotally connected at 48 to the slide 41.

A rotational speed sensing unit is generally indicated at 50; it is provided with suitable weights 50' which are pivotally mounted on a bracket 51 connected to the adjacent end of a shaft 52, the latter being driven from the engine in any suitable manner, not shown. The speed sensing unit 50 is adapted to actuate a servo valve 53, carrying suitable lands 53' and 53'', the latter controlling the inlet to passages 54 and 55, which lead to cylinder chambers 56 and 57 on opposite sides of the servo piston 34. Since the speed sensing unit 50 is driven in relation to engine speed, the force exerted by the centrifugal weights 50' will be proportional to the square of engine speed. The travel of piston 34 and metering valve 32 is therefore proportional to the square of engine speed since the leftward movement of shaft 33 during engine acceleration causes compression of spring 67 through lever 81 such that the spring force is nearly equal to the flyweight force during acceleration and becomes equal to the flyweight force at equilibrium when the lands 53' and 53'' cover passages 54 and 55, The speed sensing unit 50, piston 34 and valve 32 constitute what may be considered a primary or proportional governor which does most of the fuel flow compensation for relatively quick changes in engine speed, there being a separate device, to be described, which superimposes upon the primary governor a secondary or isochronous governing action which corrects any speed error in the primary control in bringing the engine to the required equilibrium speed.

The desired engine speed may be selected by a pilot through actuation of a lever 60, which is secured on the inner end of a shaft 61, the latter being rotatably mounted in the housing 16 and having its outer end operatively connected to a pilot's control device (not shown) by any suitable means such as lever 63, shaft 64, and arm 65.

A governor spring is indicated at 67; it is interposed between the servo valve 53 and a rod or shaft 68 forming an extension of a secondary governing control element in the form of a pilot valve 69, provided with lands 69' and 69" and mounted to slide in a movable governor adjusting or resetting member in the form of a valve sleeve 70, in turn slidingly mounted in a casing 71, having an entrance port 72 through which hydraulic fluid or fuel under pressure may flow to the interior of the sleeve 70 by way of port 73. Sleeve 70 is also provided with lands 74, 75, 76 and 77 and exhaust or discharge ports 78 and 79. Sleeve 70 is connected at 80 with the upper end of lever 60 and hence is adjusted or reset in response to adjustment of the pilot's control. The governor servo piston 34 and the governor pilot valve 69 are interconnected through rod or shaft 33 and a lever 81 which is pivotally mounted at 82 on a stationary bracket 83.

The pilot valve 69 and coacting sleeve 70 control the admission of a hydraulic fluid (here fuel) through ports 84 or 85 to chambers 86 and 87 on opposite sides of a secondary governing action actuator in the form of a servo piston 88 mounted to slide in a cylinder 89 and connected through link rod 90, lever 91 and bracket 92 to the metering valve cylinder 29. The lever 91 has its effective throw rendered variable in relation to the selected speed setting and in relation to changes in engine speed as reflected by movement of the primary governing action piston 34 and the metering piston valve 32; it is pivotally connected by means of link 93, lever 94 and link 95 with the pilot controlled lever 60. Lever 94 is pivotally connected to a movable motion compensating device in the form of a differential area piston 96, provided with a valve land 96' and mounted to slide in a cylinder 97. Also mounted in the latter cylinder is another piston 98 which is limited in its movement to the left by annulus or stop ring 99 and is adapted to contact an abutment 100, constituting an extension of piston 96. The purpose of the so-called differential area piston 96 and its coacting piston 98 is to maintain a predetermined maximum and minimum rate of fuel flow for the existing engine speed irrespective of how fast the pilot may attempt to accelerate or decelerate, as will be more fully set forth in the description of operation.

The metering valve cylinder 29 is connected to a pilot valve sleeve 101 by an arm of the bracket 92, said sleeve 101 being mounted to slide in a cylinder 102 provided with ports 103, 104 and 105. These ports are controlled by valve lands 106 and 107 formed on the sleeve 101, and the latter in turn is ported at 108, 109 and 110. In the respective positions of the parts as shown in the drawing (equilibrium operation), hydraulic fluid (here fuel under pressure) for holding the pistons 96 and 98 in balance is communicated by way of passages 111 and 111' to chamber 112 through port 113, and to chamber 114 by way of passage 111', ports 103, 108 and 109. Chamber 115, intermediate pistons 98 and 96', is vented to the interior of the pilot valve sleeve 101 by ports 105 and 110, and the latter port, together with port 109, is controlled by valve lands 116 and 117 formed on a pilot valve 118, which is mounted for relative sliding movement in sleeve 101 and is pivotally connected by means of link 119 with cam follower lever 36. Springs 120 and 121 are interposed between the opposite ends of the pilot valve 118 and the adjacent ends of the sleeve 101 and function to "center" said valve and sleeve under equilibrium operating conditions.

The pilot valves 53, 69 and 118 are supplied with clean fuel under pressure by way of chamber 20, passage 122, thence through centrifuge and filtering unit generally indicated at 123, from which the cleaned and filtered fuel flows by way of conduit 124 to the passage 111; also to port 72 and port or inlet passage 125. The centrifuge 123 may be of any suitable type; as shown, it consists of a centrifugal rotor 126 provided with a drive shaft 127, which may be and preferably is driven from the engine in any suitable manner, not shown. The fuel enters centrifuge chamber 128 from passage 122 and thence flows around the centrifuge rotor 126 and into filter chamber 129, which is provided with a filter 130, the fuel passing through this filter and out into passage 124. Dirt and other foreign matter separated from the fuel by the centrifuge collects in a bottom cover and receptacle 131, which is removable together with the filter element for cleaning purposes. Use of the centrifuge prior to filtering permits effective cleaning of fuel having a relatively high proportion of dirt and other foreign matter without resorting to a prohibitively large filter element and resultant frequent cleaning of the filter.

Operation

In the respective positions of the various parts as shown in Figure 1, the engine is assumed to be operating at a steady speed, the speed sensing unit 50 being in equilibrium with its spring 67, the effective force of which is determined by the setting of the pilot's control acting through lever 60 to position pilot valve sleeve 74, which (with pilot valves 53 and 69 in their centered positions) establishes the length of spring 67. This length corresponds to a load equal to the flyweight force at the required engine speed. During equilibrium operation, the lands 69' and 69" of pilot valve 69 act with ports 78 and 79 in pilot valve sleeve 70 to hold piston 88 against movement; chambers 112 and 114 are vented to high pressure fuel through passages 124, 111, 111', port 113, and ports 103, 108, 109, thereby holding piston 96 stationary, and the lands 53', 53" of governor actuated pilot valve 53 cover passages 54 and 55 to hold governor servo piston 34 and metering valve piston 32 at the necessary metering position for the required engine speed. On Figure 2 this stable or steady state condition of engine speed is represented by points A and/or E on the steady state engine fuel requirement curve x—y.

To accelerate, the pilot rotates lever 63 clockwise, and this in turn produces rotation of lever 60 clockwise, whereupon a series of operations occurs substantially simultaneously, viz.:

(a) Metering valve cylinder 29, being mechanically connected to lever 60 by link 95, lever 94, link 93 and lever 91, is moved to the left, enlarging the area of metering restriction 31 and increasing the rate of fuel feed. The metered fuel flows from restriction 31 to the interior chamber 132 of the control housing and thence by way of conduit 133, fuel manifold 134, and fuel lines 135 to the burner nozzles 136.

(b) Pilot valve sleeve 101, being connected to cylinder 29, also moves to the left with said cylinder, and since pilot valve 118 is held resiliently centered in sleeve 101 by springs 120 and 121, it will also move to the left and rock cam follower 37 into engagement with acceleration cam 39 as spring 121 is compressed.

As sleeves 29 and 101 continue moving to the left, the pilot valve 118 remains essentially stationary so that port 109 passes over land 117 and starts to vent chamber 114 through port 137 to the lower pressure in the chamber 132. With chamber 112 vented to high pressure fuel, pistons 96 and 98 tend to move to the right, tending to move sleeves 29 and 101 to the right also, and to restore the original venting of chamber 114. The pistons 96 and 98 move to the right only enough to align port 109 with land 117. The net effect is that as soon as lever 60 has caused sleeve 101 to move far enough to start venting port 109 to the left side of land 117, further motion of lever 60 has no effect on the position of sleeve 29 since it is matched by the cancelling motion of piston 96 whenever port 109 starts to open to the left side of land 117. Since the position of sleeve 29 for which port 109 aligns with land 117 is governed by the location of the surface of the acceleration cam 39, this cam then determines the maximum opening of restriction 31 and hence the maximum fuel flow. Note that, provided the change in the setting of lever 60 is sufficiently large, the fuel flow immediately increases to the maximum value. This immediate increase in fuel flow is represented by line AB in Figure 2, wherein point B represents that fuel flow which results after an increase in the pilot's control lever setting from point A and prior to engine acceleration. The position of point B along a substantially vertical line drawn from point A is determined by the elevation of cam 39, as before described, and said position may obviously be varied by varying the cam at that point on its contour.

As a result of this increase in fuel flow, the engine starts to accelerate. This causes the weights 50' of speed sensing unit 50 to fly outwardly and move pilot valve 53 to the left, venting chamber 57 of piston 34 to high pressure fuel through passage 55 and venting chamber 56 to drain through passage 54, whereupon piston 34 and metering valve 32 start moving to the left and tend to maintain the load of spring 67 in balance with the flyweight force. Valve 32 therefore moves as a function of engine speed.

(c) As valve 32 starts traveling to the left the compression loading on spring 121 acts through link 119 to move lever 36 in a counterclockwise direction, thereby causing roller 37 to follow the downward slope of cam 39, and resulting in a rate of leftward movement of valve 118 which is greater than the rate of leftward movement of valve 32. Leftward movement of valve 118 results in venting chamber 114 to high pressure fuel, via ports 108 and 109, causing piston 98 and differential area piston 96 to move leftward, thus tending to re-align port 109 of sleeve 101 with land 117 of valve 118. Thus, the leftward motion of pistons 96 and 98, which follows the motion of valve 118, causes sleeves 101 and 29 to also follow the motion of valve 118. The net result is that as engine speed increases and metering valve 32 moves to the left, metering cylinder 29 also moves to the left, but its rate of travel is faster than that of valve 32 as determined by cam 39. Thus, the maximum fuel flow during acceleration is increased as the engine picks up speed, the amount of flow at any instant being determined by the existing speed (speed sensing unit 50) and the corresponding location of the cam follower 37 on the contoured surface of cam 39. Thus, sleeve 29 is accelerating leftwardly with respect to piston 32, during engine acceleration along the maximum fuel flow curve, resulting in a rate increase of fuel flow as represented by curve x—x of Figure 2. The slope of curve x—x is determined by the above explained relative movement of sleeve 29 with respect to piston 32. The upwardly bulging section of the downward sloping plane of cam 39 is contoured to avoid the compressor surge area, as indicated on Figure 2, by varying the fuel flow rate around said surge area to point C, as shown. Point C is an assumed governor break point at which sleeve 29 has first stopped its leftward movement due to the return of pistons 96 and 98 to the position shown in Figure 1, as hereafter explained.

(d) As the engine accelerates sleeve 29 moves to the left as a result of the leftward movement of pistons 96 and 98, which movement is controlled by cam 39, as above explained. Ultimately piston 98 re-engages stop 99. Further speed increase restores valve 118 to the centered position shown giving full high pressure venting to chamber 114, and locking piston 98 solidly against stop 99. Differential area piston 96 is held solidly locked against piston 98 by high pressure in chamber 112. With sleeve 29 now stationary, further speed increase causes valve 32 to start cutting off the fuel at restriction 31. When the fuel flow has been reduced to match the engine requirement for the existing speed, valve 32 then governs with a primary proportional action (i.e. the governed speed varies proportionally with the fuel requirement). Primary proportional governor action is well known in the art and is represented on Figure 2 by line C—D. Since this type of governing does not provide a constant speed setting for all conditions, the setting (which is initially made by positioning link 95) of this proportional governor is slowly altered to bring the speed to the desired value. This is accomplished by moving sleeve 29 with piston 88 as necessary to alter the speed setting of the primary governor until valve 69 is brought to its neutral position in sleeve 70. The position of sleeve 70 is determined by lever 60 and is selected by the pilot. Pilot valve 69 then has a vernier or secondary governor action. Ports 78 and 79 in sleeve 70 are made small to give an extremely sluggish motion to piston 88. This slow action of piston 88 prevents governor instability. The isochronous or secondary governor action is represented in Figure 2 by line D—E. Point E is here assumed to represent that engine speed on the steady state curve x—y, initially chosen when the throttle or pilot's control lever 66 was advanced for engine acceleration from point A. The speed at point E is essentially the same as speed at point C. The slight travel of piston 88 during the acceleration process does not affect the maximum acceleration flow since it is compensated for in the motion of pistons 96 and 98. The parameters which determine the upper limit of acceleration fuel flow are compressor inlet air density and engine r.p.m. The actual maximum fuel flow is made such a function of these parameters (by the contouring of cam 39) that the engine will accelerate without exceeding permissible burner temperatures or operate in the region of compressor surge.

To decelerate, the pilot rotates lever 63 counterclockwise, and this in turn produces rotation of lever 60 counterclockwise, whereupon the foregoing series of operations are reversed, viz. metering valve cylinder 29 and pilot valve cylinder 101 move to the right, reducing the area of metering restriction 31, cam follower 38 contacts deceleration cam 40, high pressure fuel is vented to chamber 115, moving piston 96 as necessary to prevent further reduction of fuel flow when the scheduled minimum flow is reached, whereupon the engine begins to lose speed. This decrease in fuel flow from a point of steady state engine operation to the minimum flow curve is illustrated by the points E and F on Figure 2. The resulting loss in speed causes the governor weights 50' to move inwardly, whereupon governor spring 67 pushes pilot valve 53 to the right, chamber 57 of the primary governor servo is vented to chamber 132 and chamber 56 to high pressure fuel, and piston 34 moves to the right as does also metering piston 32 and pilot valve 118, but the latter will move at a rate faster than the rate of travel of piston 32 by an amount determined by the downward slope of the contour of cam 40. As engine speed decreases, the rightward movement of cylinder 29, being faster than that of piston 32, will gradually reduce the area of the metering orifice 31 until piston 96 returns to contact piston 98, stopping further travel of sleeve 29. This condition is illustrated in Figure 2 by the deceleration, or minimum flow, curve FG. Further engine speed decrease results in increasing the fuel flow until the engine settles out at the new governed speed as illustrated in Figure 2 by the governor break and reset curve GHA. Again, the motion of lever 60 has repositioned sleeve 70 so that the secondary governing action may hold the new setting accurately, as illustrated in Figure 2 by line HA.

Altitude idle fuel flow is that minimum flow which determines the lowest operating engine r.p.m. at the higher altitudes. Relatively high engine idle speeds are desirable at these altitudes (usually 30,000 feet and above) so that there is no danger of burner die-out when idling under these conditions and so that the engine may be accelerated from altitude idle in a relatively short time. Any desired altitude idle fuel flow schedule may be obtained by appropriate contouring of cam 40. Cam 40 is contoured so that the reduction in the rate of feed of deceleration fuel is never faster than that set for burner die-out limits irrespective of how suddenly the pilot may reduce his speed setting and/or of movement of servo piston 88 toward the left.

*Steady speed governing.*—During this period, any variation in engine speed from that selected by the pilot will be sensed by the primary speed sensing unit 50, whereupon the metering piston 32 will be immediately repositioned by the servo piston 34. Should there be a speed error in the action of the primary governor, then the secondary governing action of device 69, 70, 88 corrects the error and brings the engine to the required equilibrium speed. For example, assume at a given speed setting of the pilot's lever the load on the engine decreased or changed in a direction tending to increase engine speed beyond that selected by the pilot, then the governor weights 50' would fly out and move servo valve 53 to the left. This would vent chamber 57 to high pressure fuel and chamber 56 to drain and cause piston 34 and hence metering valve 32, to move to the left and reduce the area of metering orifice 31 by an amount essentially proportional to the error in engine speed, sleeve 29 during at least the start of this action remaining fixed. Should the engine speed now be off the setting of pilot valve sleeve 70 as determined by the pilot's control, pilot valve 69 will be off center relatively to ports 78 and 79; in this case lands 69' and 69" would be to the right of said ports and chamber 87 would be vented to high pressure fuel and chamber 86 to drain. Piston 88 would then move slightly to the left and this in turn would impart a corresponding movement to the right of sleeve 29, further reducing the rate of fuel feed. Thus pilot valve 69, reset sleeve 70, and actuator 88 provide a secondary isochronous governing action which may be more exact than the action of the primary governor 50.

*Altitude compensation.*—Cams 39 and 40 are contoured not only to maintain a predetermined rate of fuel feed as a function of engine speed during acceleration and deceleration, but also to correct for changes in the pressure and temperature of the air flowing to the engine. Thus, should there be a decrease in pressure due to an increase in altitude, bellows 42 will expand and move cam slide 41 and hence cams 39 and 40 in a direction to reduce the rate of fuel feed, an increase in pressure having the opposite effect. The metering port 31 in the sleeve 29 is preferably of logarithmic design (equal percent flow change for equal increments of travel), so that over-all governor response at altitude will be substantially equivalent to that at sea level.

The herein disclosed fuel control has the ability to use fuels containing a relatively large amount of dirt, sludge and other matter not uncommon in fuels for gas turbine or turbojet engines. Only the by-pass valve 24 and the metering valve 32 need pass fuel to the engine, and these may be readily designed for minimum sensitivity to dirt accumulation. The primary governing action is fast, while the secondary or isochronous governing action is relatively slow, as heretofore explained, so that governor instability is not encountered, while the overall characteristic of both governing actions is to minimize over-running at cut-off. The combined cam and servo acceleration and deceleration control system provides a semipositive follow-up on the manual and automatic fuel feed varying means which insures close upper and lower limits while at the same time giving quick response within such limits.

Although only one embodiment of the invention has been illustrated schematically and described, it will be obvious that various changes in form and relative arrangement of parts may be necessary and desirable to suit requirements.

I claim:

1. In a system for supplying fuel to an engine, fuel flow regulating means including a pair of coacting valve members adjustable either singly or jointly to vary the rate of fuel feed, means for manually positioning at least one of said valve members to initiate a change in engine speed, servo motors for actuating said valve members, servo valve means for controlling said motors, engine speed sensing means operatively connected to said servo valve means for positioning said servo motors as a function of engine speed, said servo valve means having a movable resetting element connected to said manual means, said resetting element being fully adjustable by said manual means to select an engine operating speed, and a motion compensating device operatively associated with said manual means and coacting valve member functioning to maintain a predetermined limit on the rate of fuel following resetting of said element irrespective of how quickly the manual means may be moved to reset said element to different speed settings.

2. In a fuel feeding system for a gas turbine engine, fuel flow regulating means including a pair of coacting valve members adjustable to vary the rate of fuel feed, first engine speed responsive means for regulating one of said valve members as a function of engine speed, second engine speed responsive means for regulating the other of said valve members as a function of engine speed, operator-controlled means arranged to adjust one of said valve members to initiate acceleration or deceleration of the engine and to substantially simultaneously reset at least one of said speed responsive means to a new selected operating speed value, said first and second speed responsive means coacting to control engine operation at the selected speed, cam means having cam surfaces contoured to maintain, at any given altitude of operation, a predetermined upper limit on the rate of fuel feed during an acceleration of the engine and/or a predetermined lower limit on the rate of fuel feed during a deceleration of the engine, and means operatively connecting said cam means to one of said valve members in such a way that said valve member is actuated to follow the contoured surface of said cam means during a transient in engine speed to said selected speed value.

3. A fuel feeding system as claimed in claim 2 wherein said cam means is also provided with a cam surface contoured to modify the rate of fuel feed in relation to changes in the pressure and temperature of the air flowing to the engine, and pressure and/or temperature responsive means adapted to reposition said cam means.

4. A fuel feeding system as claimed in claim 2 wherein said operator controlled means is connected to its associated valve member through a motion compensating device arranged to permit the speed responsive means and coacting cam means to regulate said valve members as a function of engine speed irrespective of how suddenly the operator controlled means may be moved to a new speed setting.

5. In a fuel feeding system for a gas turbine engine, fuel flow regulating means including a pair of coacting valve members adjustable either singly or jointly to vary the rate of fuel feed, a first engine speed responsive means including an actuator in the form of a first servo motor connected to one of said valve members and an engine speed sensing means for controlling said servo motor, a second engine speed responsive means including an actuator in the form of a second servo motor connected to the other of said valve members, said second means being coactable with said first means and operable in relation to engine speed for controlling said second servo motor, means for resetting at least one of said speed responsive means, operator controlled means connected to one of said valve members and to said resetting means for initiating acceleration and deceleration of the engine to a selected speed and for simultaneously adjusting said resetting means to cause the first and second means to establish and maintain the selected speed, said second means being adapted to correct for off-selected speed errors resulting from the action of the first means.

6. In a fuel feeding system for a gas turbine engine, fuel flow regulating means including a fuel flow control orifice, a pair of coacting valves adjustable either singly or jointly to vary the rate of fuel feed through said orifice, an engine speed governor including an actuator in the form of a servo motor connected to one of said valves, operator controlled means for adjusting the other of said valves to accelerate and decelerate the engine, cam means having cam surfaces contoured to maintain, at any given altitude, a predetermined upper limit on the rate of fuel feed during an acceleration of the engine, and a cam follower movable with the speed governor controlled valve and operatively connected to the other and coacting valve.

7. In a fuel feeding system for a gas turbine engine, fuel flow regulating means including a fuel flow control orifice, a pair of coacting valves adjustable either singly or jointly to vary the rate of fuel feed, an engine speed governor including an actuator in the form of a servo motor connected to one of said valves and an engine speed sensing means arranged to control said servo motor, operator-controlled means operatively connected to the other of said valves to initiate a change in engine speed, cam means having cam surfaces contoured to maintain, at any given altitude, a predetermined upper limit on the rate of fuel feed during acceleration of the engine, a cam follower movable with the speed governor controlled valve member and operatively connected to the coacting valve member whereby an increase in engine speed causes both of said valves to be simultaneously adjusted in accordance with different functions of engine speed, and a motion compensating device associated with the operator controlled means and its coacting valve member for limiting the rate of fuel flow as a function of engine speed irrespective of how suddenly said latter means may be moved to a new or selected speed setting.

8. A fuel feeding system as claimed in claim 7, wherein said motion compensating device comprises a servo piston and a servo valve for operating the piston, said servo valve comprising a movable ported valve sleeve connected to the operator controlled valve and a pilot valve connected to said follower, the pilot valve being resiliently urged toward a null position in said sleeve and becoming effective when displaced to move said piston in a motion compensating direction.

9. In a fuel control system for an engine, valve means for varying the rate of fuel feed, an engine all-speed governor adapted to be driven in relation to engine speed, means operatively connecting said governor to the valve means; and means for rendering engine speed governing substantially isochronous at selected operational speeds including a servo motor operatively connected to said valve means, a motor-energizing member movable to different positions corresponding to selected engine operational speeds for controlling said servo motor, manual means for re-setting said member and effective to initiate a change in the rate of fuel feed and a resultant change in engine speed, cam means including a follower member operatively connected to said valve means, and a follow-up member movable in relation to engine speed coacting with said first-named member to energize the motor, said follow-up member attaining a null position with respect to said first-named member at the selected speed, said cam means actuable as a function of engine inlet air density and contoured as a function of engine speed to limit the fuel flow from said valve means to predetermined maximum and minimum limits during a transient in engine speed.

10. In a fuel feeding system for a gas turbine engine, fuel flow regulating means including a fuel flow control orifice, a pair of coacting valve members adjustable either singly or jointly to vary the rate of fuel feed through said orifice, an engine speed governor including an actuator in the form of a servo motor connected to one of said valve members and an engine speed sensing means arranged to control said servo motor, operator-controlled means operatively connected to the other of said valve members to initiate a change in engine speed, cam means having a cam surface contoured to control one of said valve members during acceleration of the engine so that a predetermined upper limit on the rate of fuel feed is controlled by said member, and a cam follower movable with the speed governor controlled valve member and operatively connected to the coacting valve member, whereby an increase in engine speed causes both of said valves to be simultaneously adjusted in accordance with different functions of engine speed.

References Cited in the file of this patent

UNITED STATES PATENTS

| | | |
|---|---|---|
| 2,332,188 | Andrews | Oct. 19, 1943 |
| 2,372,989 | Udale | Apr. 3, 1945 |
| 2,489,586 | Ray | Nov. 29, 1949 |
| 2,614,617 | Bobier | Oct. 21, 1952 |
| 2,689,606 | Mock | Sept. 21, 1954 |
| 2,720,751 | Kunz | Oct. 18, 1955 |

FOREIGN PATENTS

| | | |
|---|---|---|
| 402,935 | Great Britain | Dec. 14, 1933 |
| 27,722 | Norway | Mar. 5, 1917 |

OTHER REFERENCES

Mechanical Engineer's Handbook, by Marks, Fifth Edition, published by McGraw-Hill Book Co., New York, N.Y., pages 2105 and 2106.

UNITED STATES PATENT OFFICE
CERTIFICATION OF CORRECTION

Patent No. 2,949,957            August 23, 1960

James M. Eastman

It is hereby certified that error appears in the above numbered patent requiring correction and that the said Letters Patent should read as corrected below.

Column 1, line 63, for "to", first occurrence, read -- go --; same line, for "ful" read -- fuel --; column 2, line 42, for "suitable" read -- suitably --.

Signed and sealed this 6th day of June 1961.

(SEAL)
Attest:

ERNEST W. SWIDER
Attesting Officer

DAVID L. LADD
Commissioner of Patents